United States Patent
Lee

(10) Patent No.: US 9,358,467 B2
(45) Date of Patent: Jun. 7, 2016

(54) GAME LOAD MANAGEMENT

(71) Applicant: Empire Technology Development LLC, Wilmington, DE (US)

(72) Inventor: Hyoung-Gon Lee, Gyeonggi-do (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/372,340

(22) PCT Filed: Jul. 22, 2013

(86) PCT No.: PCT/US2013/051441
§ 371 (c)(1),
(2) Date: Jul. 15, 2014

(87) PCT Pub. No.: WO2015/012786
PCT Pub. Date: Jan. 29, 2015

(65) Prior Publication Data
US 2015/0072792 A1     Mar. 12, 2015

(51) Int. Cl.
*A63F 13/12* (2006.01)
*G07F 17/32* (2006.01)
*A63F 13/358* (2014.01)
*A63F 13/30* (2014.01)
*G06F 9/50* (2006.01)
*H04L 12/911* (2013.01)
*H04L 29/06* (2006.01)

(52) U.S. Cl.
CPC ............... *A63F 13/358* (2014.09); *A63F 13/12* (2013.01); *G06F 9/5083* (2013.01); *H04L 47/822* (2013.01); *H04L 67/42* (2013.01)

(58) Field of Classification Search
USPC .......................................................... 463/42
See application file for complete search history.

(56) References Cited

U.S. PATENT DOCUMENTS

| 6,560,717 B1 | 5/2003 | Scott |
| 7,868,891 B2 | 1/2011 | Wexler |
| 8,342,948 B2 | 1/2013 | Lyons et al. |

(Continued)

FOREIGN PATENT DOCUMENTS

| CN | 101378390 A | 3/2009 |
| JP | 2006081895 A | 3/2006 |

(Continued)

OTHER PUBLICATIONS

Addbot, "Energy demand management," Wikipedia, accessed at http://en.wikipedia.org/w/index.php?title=Energy_demand_management&oldid=541181611, Feb. 28, 2013, pp. 3.

(Continued)

*Primary Examiner* — Pierre E Elisca
(74) *Attorney, Agent, or Firm* — Brundidge & Stanger, P.C.

(57) ABSTRACT

Technologies are generally described for a load balancing scheme. In some examples, a method performed under control of a load balancing system may include associating a candidate client device with a lower-resolution client device; measuring resource usage of a game server; determining that the measured resource usage has exceeded a predetermined threshold; and transmitting, to the candidate client device and/or the associated lower-resolution client device, a message that instructs a user of the candidate client device to perform a predetermined task using the associated lower-resolution client device.

22 Claims, 7 Drawing Sheets

(56) References Cited

U.S. PATENT DOCUMENTS

| | | |
|---|---|---|
| 8,342,949 B2 | 1/2013 | Walker et al. |
| 8,359,361 B2 | 1/2013 | Thornton |
| 8,435,121 B1 | 5/2013 | Fisher et al. |
| 8,543,582 B1 | 9/2013 | Granstrom |
| 8,556,724 B2 * | 10/2013 | Dale .................. H04L 67/1002 463/42 |
| 8,795,087 B2 * | 8/2014 | Kim .............................. 463/42 |
| 2005/0060542 A1 | 3/2005 | Risan et al. |
| 2007/0061202 A1 | 3/2007 | Ellis |
| 2007/0293319 A1 | 12/2007 | Stamper et al. |
| 2008/0082977 A1 | 4/2008 | Araujo et al. |
| 2009/0067425 A1 | 3/2009 | Komiya et al. |
| 2009/0119168 A1 | 5/2009 | Otto et al. |
| 2009/0253487 A1 | 10/2009 | Gagner |
| 2010/0094728 A1 | 4/2010 | Denning et al. |
| 2010/0105454 A1 | 4/2010 | Weber |
| 2010/0271375 A1 | 10/2010 | Diard |
| 2011/0087960 A1 | 4/2011 | Tabone |
| 2011/0088071 A1 | 4/2011 | Yerli |
| 2011/0119293 A1 | 5/2011 | Taylor |
| 2011/0157193 A1 | 6/2011 | Boucher et al. |
| 2011/0258342 A1 | 10/2011 | Gagliardi et al. |
| 2012/0052954 A1 | 3/2012 | Zhu et al. |
| 2012/0079606 A1 | 3/2012 | Evans et al. |
| 2012/0102185 A1 * | 4/2012 | Fernandes .................. 709/224 |
| 2012/0142429 A1 * | 6/2012 | Muller ............................ 463/42 |
| 2012/0233345 A1 | 9/2012 | Hannuksela |
| 2012/0252582 A1 | 10/2012 | Hilleman |
| 2012/0297238 A1 | 11/2012 | Watson et al. |
| 2013/0117457 A1 | 5/2013 | Allen et al. |
| 2013/0210526 A1 * | 8/2013 | Kim .................... H04L 67/1002 463/42 |
| 2013/0344965 A1 * | 12/2013 | Dale .................. H04L 67/1002 463/42 |
| 2015/0375113 A1 * | 12/2015 | Justice .................. A63F 13/355 463/42 |

FOREIGN PATENT DOCUMENTS

| | | |
|---|---|---|
| JP | 2008097184 A | 4/2008 |
| JP | 2009233098 A | 10/2009 |
| JP | 2010269047 A | 12/2010 |
| JP | 2011186834 A | 9/2011 |
| JP | 2011206219 A | 10/2011 |

OTHER PUBLICATIONS

Bezerra, C. E. and Geyer C. F., "A load balancing scheme for massively multiplayer online games," Multimedia Tools and Applications, vol. 45, Issue 1-3, pp. 263-289, Springer Science + Business Media, LLC (2009).

International Search Report and Written Opinion for International Application No. PCT/US13/51441, mailed on Feb. 7, 2014.

Merrick, C., "What exactly is Cloudbursting?," accessed at http://web.archive.org/web/20130527183117/http://www.greenbutton.com/blog/index.php/2013/01/28/what-exactly-is-cloudbursting, Jan. 28, 2013, GreenButton, pp. 2.

Stonebraker, M., "An Overview of the Sequoia 2000 Project," Digital Technical Journal, vol. 7, No. 3, pp. 39-49 (1995).

S. Ahmad, et al., "The Community Network Game Project: Enhancing Collaborative Activities in Online Games", 6 pages (Nov. 2011).

International Search Report and Written Opinion from International Application No. PCT/US2012/024995 mailed May 29, 2012.

* cited by examiner

GAME LOAD MANAGEMENT

CROSS-REFERENCE TO RELATED APPLICATIONS

This application is the U.S. National Stage filing under 35 U.S.C. §371 of PCT Application Ser. No. PCT/US13/51441, filed on Jul. 22, 2013. The disclosure of the PCT Application is hereby incorporated herein by reference in its entirety.

BACKGROUND

Cloud computing technologies have been enticing users to enjoy high-quality games with their devices (e.g., game consoles, set-top boxes, smartphones, tablets, laptop or desktop computers, and digital televisions). In the cloud-based environment, a game server that provides a high-performance gaming experience (e.g., with high processing power) may run or execute a high-quality game application, and provide a game service to multiple user devices communicatively connected to the game server.

SUMMARY

In an example, a method performed under control of a load balancing system may include associating a candidate client device with a lower-resolution client device; measuring resource usage of a game server; determining that the measured resource usage has exceeded a predetermined threshold; and transmitting, to the candidate client device and/or the associated lower-resolution client device, a message that instructs a user of the candidate client device to perform a predetermined task using the associated lower-resolution client device.

In another example, a load balancing system may include a resource usage measurement unit configured to measure resource usage of a game server; a candidate identification unit configured to identify, from among multiple client devices that are communicatively connected to the game server, a candidate client device that is associated with a lower-resolution client device; and a transmission unit configured to transmit, to the candidate client device identified by the candidate identification unit and/or the associated lower-resolution client device, a message that instructs a user of the candidate client device to perform a predetermined task using the associated lower-resolution client device, when the resource usage measured by the resource usage measurement unit exceeds a predetermined threshold.

In yet another example, a computer-readable storage medium may store thereon computer-executable instructions that, in response to execution, cause a processor to perform operations, including determining, from among multiple players who play a game provided by a game server, a player who is playing the game with a first device and owns a second device, a resolution of which is lower than a resolution of the first device; and directing the player to play the game with the second device when resource usage of the game server exceeds a predetermined threshold.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
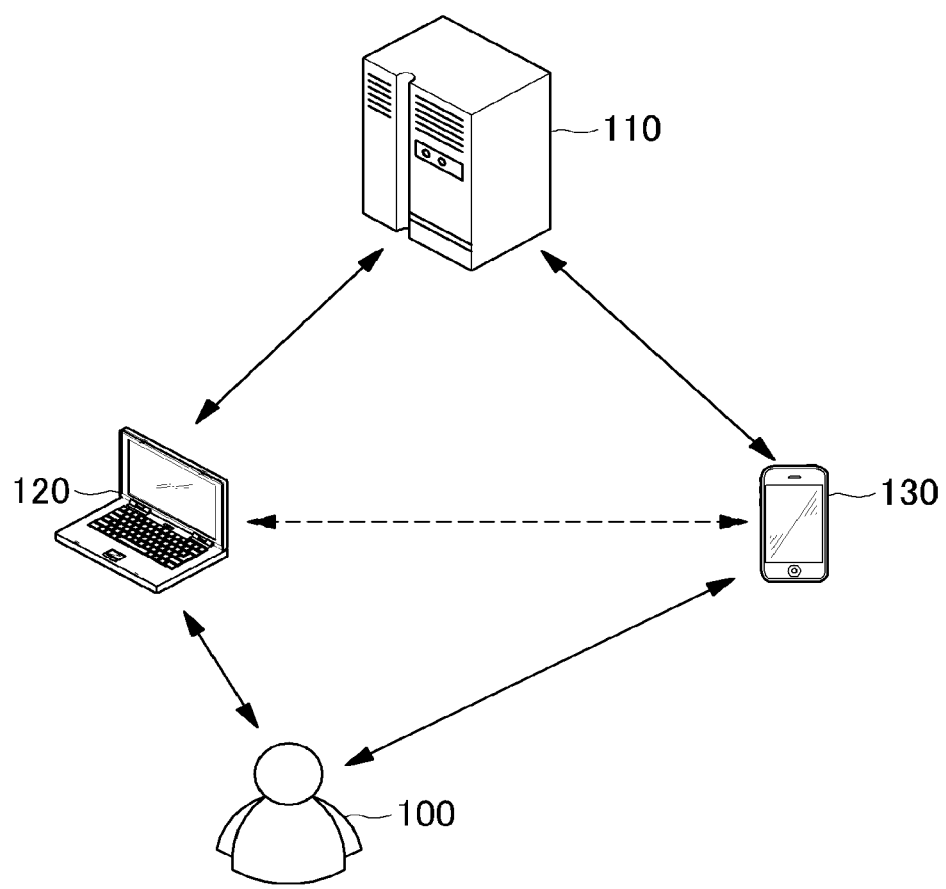
FIG. 1 schematically shows an illustrative example of an environment in which a game server provides a game service to a user who may use multiple client devices, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a load balancing scheme for a cloud-based game system in which a game server may provide a game service to multiple client devices over a network. Further, technologies are herein generally described a game load management scheme for the game server.

In some examples, a processing load imposed on the game server may exceed the game server's processing capabilities when the number of accessing client devices exceeds a threshold amount. In such cases, the game server may direct or instruct at least one of multiple players who are currently playing a game provided by the game server to switch to playing on another client device with a lower resolution, or otherwise imposes a reduced processing burden upon the game server, so as to lower the overall processing load of the game server.

In some examples, a load balancing system hosted by the game server may determine, from among the multiple players, a player who is playing the game with a first device and owns a second device, a resolution of which is lower than a resolution of the first device. Then, the load balancing system may direct or instruct the player to play the game on the second device when resource usage of the game server exceeds a predetermined threshold.

The resource usage of the game server may be associated with at least one of usage of a central processing unit (CPU) of the game server, usage of a graphic processing unit (GPU) of the game server, usage of a main memory of the game server, usage of a graphic memory of the game server, I/O (input/output) usage of the game server (e.g., bandwidth usage of a network to which the game server is connected, storage usage of the game server, etc.), or power consumption of the game server, etc. Further, the predetermined threshold may be associated with processing power or capabilities of the game server, which may be associated with at least one of processing power of the CPU of the game server, processing power of the GPU of the game server, capacity of the main memory of the game server, capacity of the graphic memory of the game server, I/O capacity of the game server, or power capacity of the game server, etc. For instance, the predetermined threshold may be set as a particular percentage (e.g., 80%, 90%, 95%, etc.) of a peak load for any one or more of the aforementioned resources that the game server may be able to bear.

By way of example, but not limitation, it may be assumed that one of the multiple players may play a particular game using his/her desktop computer. It may be revealed that the same player may also own two more lower-resolution client devices, i.e., a tablet and a smartphone, on which to play the game. Thus, the three client devices (i.e., desktop computer, tablet and smartphone) may be registered with the game server, i.e., with the corresponding game service provider, as being assigned to the player, so that the game server may allow the player to play the game with the same or at least similar gaming experience as on any of the three client devices. In such cases, when the load balancing system determines that the resource usage of the game server has exceeded the predetermined threshold, the load balancing system may determine whether the respective lower-resolution client devices registered to the user are eligible for usage so that the user may continue the current gaming experience. For instance, the load balancing system may transmit, to the desktop computer, a query regarding usage availability of each of the lower-resolution client devices; check whether the desktop computer and any of the lower-resolution client devices are located proximate to each other; and/or check whether the desktop computer and any of the lower-resolution client devices are communicatively connected to each other. In this example, when the load balancing system determines that the smartphone, among the two lower-resolution client devices, is eligible for usage, the load balancing system may transmit, to the desktop computer and/or the smartphone, a message that instructs the player to perform a particular gaming task using the user's smartphone. For instance, the smartphone may depict a dungeon in the game while the desktop computer may depict a broader environment in the context of the game; or the player may receive, from a gaming service provider corresponding to the game server, an incentive such as an additional game item when the player performs the predetermined task on the user's smartphone as opposed to the user's desktop computer. In such cases, the player may play the same game, while the processing load imposed on the game server may be alleviated.

FIG. 1 schematically shows an illustrative example of an environment in which a game server provides a game service to a user who may use multiple client devices, arranged in accordance with at least some embodiments described herein.

As depicted, a user 100 may play a game for which the contents may be provided by a game server 110 with a first client device 120. First client device 120 may be communicatively connected to game server 110 over a network such as, for example, the Internet, a cellular network, a wide area network (WAN), a metropolitan area network (MAN), a local area network (LAN), a campus area network (CAN), a virtual private network (VPN), etc.

In some embodiments, user 100 may also use a second client device 130, a resolution of which may be lower than a resolution of first client device 120, to play the game. Both of first client device 120 and second client device 130 may be registered on game server 110 or a corresponding game service provider, and may further be of any type of electronic device configured to store, retrieve, compute, transmit and/or receive data, including, for example, a smartphone, a mobile phone, a personal digital assistant (PDA), a tablet, a personal computer such as a laptop computer or a desktop computer, a television, a gaming console, etc. By way of example, but not limitation, first client device 120 may be a desktop computer supporting a resolution of 1920×1080, while second client device 130 may be a smartphone supporting a resolution of 960×640.

In some embodiments, a load balancing system (not shown in FIG. 1, but described in more detail below) hosted by game server 110 may associate first client device 120 and second client device 130, in accordance with their registration on game server 110 or the corresponding game service provider. By way of example, but not limitation, first client device 120 and second client device 130 may be registered to user 100. Then, in some embodiments, the load balancing system may store information regarding a relationship among user 100, first client device 120 and second client device 130.

In some embodiments, the load balancing system may measure current resource usage of game server 110, and determine whether the measured resource usage has exceeded a predetermined threshold. By way of example, but not limitation, the resource usage of game server 110 may be associated with at least one of usage of a central processing unit (CPU) of game server 110, usage of a graphic processing unit (GPU) of game server 110, usage of a main memory of game server 110, usage of a graphic memory of game server 110, I/O (input/output) usage of game server 110 (such as bandwidth usage of a network to which game server 110 is connected, storage usage of game server 110, etc.), or power consumption of game server 110, etc. Further, the predetermined threshold may be associated with processing capabilities or power of game server 110, which may be associated with at least one of processing power of the CPU of game server 110, processing power of the GPU of game server 110, capacity of the main memory of game server 110, capacity of the graphic memory of game server 110, I/O capacity of game server 110, or power capacity of game server 110, etc. For instance, the predetermined threshold may be set as a particular percentage (e.g., 80%, 90%, 95%, etc.) of a peak load that game server 110 may be able to bear.

In some embodiments, when the load balancing system determines that the measured resource usage has exceeded the predetermined threshold, the load balancing system may determine whether second client device 130 is eligible for usage based on, at least, a user input regarding the processing capabilities and resource requirements of second client device 130; whether first client device 120 and second client device 130 are located proximate to each other (e.g., within an acceptable distance for communication with each other); and/ or whether first client device 120 and second client device 130 are communicatively connected to each other. By way of example, but not limitation, the load balancing system may transmit, to first client device 120, a query regarding usage availability of second client device 130, with an expectation that user 100 would reply to the query. By way of another example, but not limitation, the load balancing system may determine the usage availability of second client device 130 through a machine-to-machine (M2M) connection test based on a near field communication (NFC), Bluetooth, or peer to peer (P2P) communication protocol, etc.

In some embodiments, when the load balancing system determines that second client device 130 is eligible and/or available for usage, the load balancing system may instruct user 100 to continue to play the game on second client device 130 instead of first client device 120. By way of example, but not limitation, the load balancing system may transmit, to first client device 120 and/or second client device 130, a message that instructs user 100 to perform a predetermined gaming task using second client device 130. For instance, the load balancing system may instruct first client device 120 to show at least portions of a virtual world or environment depicted in the game, while having second client device 130 show a dungeon or other small room that is included in the game; or may provide user 100 with an incentive such as an additional game item when user 100 performs the predetermined task with second client device 130.

Although FIG. 1 illustrates one user 100 who plays the game provided by game server 110, those skilled in the art will readily appreciate that multiple users may simultaneously play the game, and that the load balancing system may identify at least some of the multiple users, who may play the game with other lower-resolution client devices, and perform the operations and/or functions described above for the respective identified users.

Figure 2:
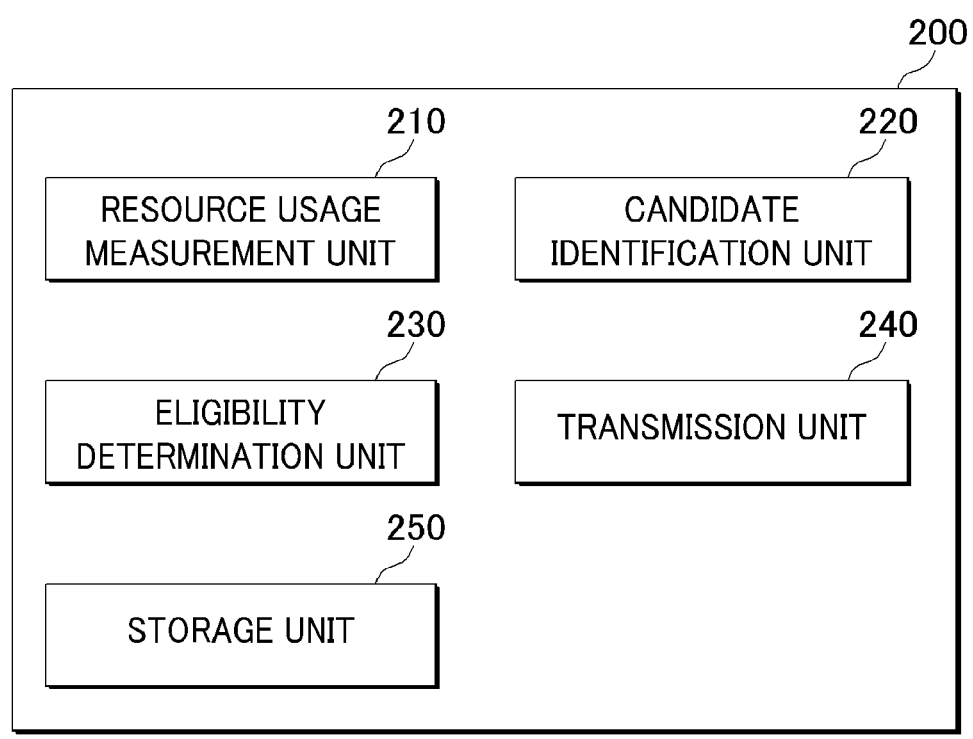
FIG. 2 shows a schematic block diagram illustrating an example architecture of a load balancing system, arranged in accordance with at least some embodiments described herein.

FIG. 2 shows a schematic block diagram illustrating an example architecture of a load balancing system 200, arranged in accordance with at least some embodiments described herein.

Load balancing system 200 may be hosted by game server 110 as illustrated in FIG. 1. In this regard, reference may be made to the embodiments depicted and described with reference to FIG. 1.

As depicted, load balancing system 200 may include a resource usage measurement unit 210, a candidate identification unit 220, an eligibility determination unit 230, a transmission unit 240, and a storage unit 250. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or any combination thereof.

Resource usage measurement unit 210 may be configured to measure current resource usage of game server 110. By way of example, but not limitation, the resource usage of game server 110 may be associated with at least one of usage of a central processing unit (CPU) of game server 110, usage of a graphic processing unit (GPU) of game server 110, usage of a main memory of game server 110, usage of a graphic memory of game server 110, I/O (input/output) usage of game server 110 (such as bandwidth usage of a network to which game server 110 is connected, storage usage of game server 110, etc.), or power consumption of game server 110, etc. Resource usage measurement unit 210 may also be configured to compare the measured current resource usage of game server 110 with a predetermined threshold.

Candidate identification unit 220 may be configured to identify, from among multiple client devices that are communicatively connected to game server 110, a candidate client device (e.g., first client device 120 in FIG. 1) that is associated with a lower-resolution client device (e.g., second client device 130 in FIG. 1) based on, at least, its registration on game server 110 or a corresponding game service provider.

Eligibility determination unit 230 may be configured to determine whether the associated lower-resolution client device is eligible and/or available for usage. By way of example, but not limitation, eligibility determination unit 230 may be configured to determine whether the associated lower-resolution client device is eligible and/or available for usage based on, at least, a user input. By way of another example, but not limitation, eligibility determination unit 230 may be configured to determine whether the associated lower-resolution client device is eligible and/or available for usage based on, at least, whether the candidate client device and the associated lower-resolution client device are located proximate to each other, and/or communicatively connected to each other.

Transmission unit 240 may be configured to transmit, to the candidate client device and/or the associated lower-resolution client device, a message that instructs a user (e.g., user 100 in FIG. 1) of the candidate client device to perform a predetermined gaming task using the associated lower-resolution client device, when the current resource usage measured by resource usage measurement unit 210 exceeds the predetermined threshold, and when eligibility determination unit 230 determines that the associated lower-resolution client device is eligible and/or available for usage. By way of example, but not limitation, the predetermined threshold may be associated with processing power of game server 110, which may be associated with at least one of processing power of the CPU of game server 110, processing power of the GPU of game server 110, capacity of the main memory of game server 110, capacity of the graphic memory of game server 110, I/O capacity of game server 110, or power capacity of game server 110, etc.

Storage unit 250 may be configured to store information regarding a relationship among the candidate client device, the associated lower-resolution client device, and the user.

Figure 3:
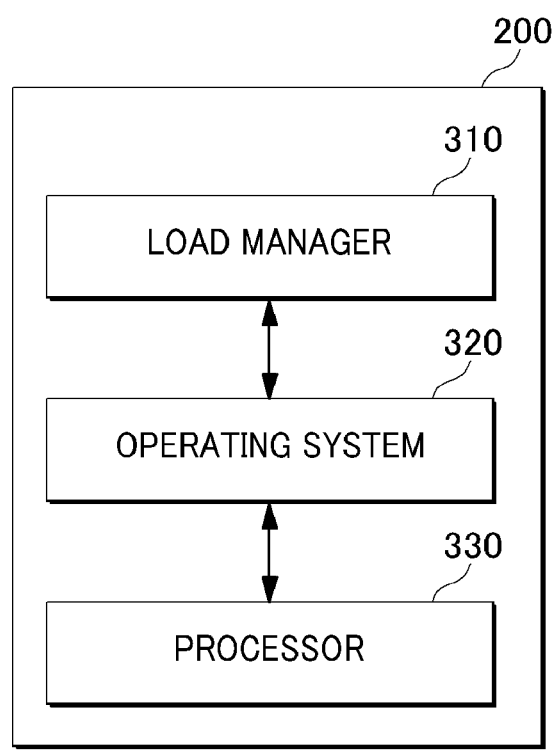
FIG. 3 shows a schematic block diagram illustrating another example architecture of a load balancing system, arranged in accordance with at least some embodiments described herein.

FIG. 3 shows a schematic block diagram illustrating another example architecture of load balancing system 200, arranged in accordance with at least some embodiments described herein. Reference may be made to the embodiments depicted and described with reference to FIGS. 1-2.

As depicted, load balancing system 200 may include a load manager 310, an operating system 320 and a processor 330. Load manager 310 may be an application adapted to operate on operating system 320 such that the load balancing scheme, as described herein, may be provided. Operating system 320 may allow load manager 310 to manipulate processor 330 to implement the load balancing scheme as described herein.

Figure 4:
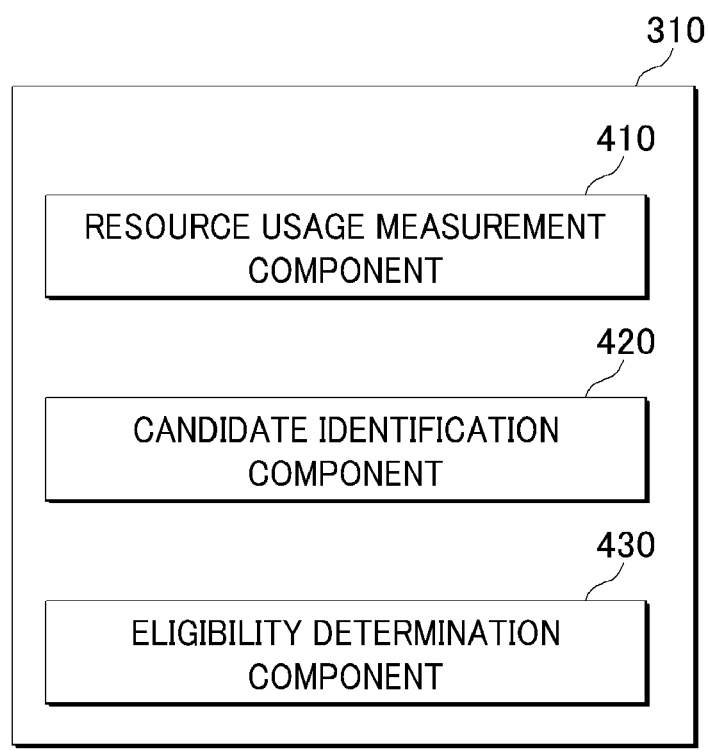
FIG. 4 shows a schematic block diagram illustrating an example architecture of a load manager, arranged in accordance with at least some embodiments described herein.

FIG. 4 shows a schematic block diagram illustrating an example architecture of load manager 310, arranged in accordance with at least some embodiments described herein. Reference may be made to the embodiments depicted and described with reference to FIGS. 1-3.

As depicted, load manager 310 may include a resource usage measurement component 410, a candidate identification component 420, and an eligibility determination component 430. Resource usage measurement component 410 may be adapted to measure resource usage of game server 110. Candidate identification component 420 may be adapted to identify, from among multiple client devices that are communicatively connected to game server 110, a candidate client device (e.g., first client device 120 in FIG. 1) that is associated with a lower-resolution client device (e.g., second client device 130 in FIG. 1). Eligibility determination component 430 may be adapted to determine whether the associated lower-resolution client device is eligible and/or available for usage, so that a user (e.g., user 100 in FIG. 1) of the candidate client device may perform a task with the associated lower-resolution client device.

Figure 5:
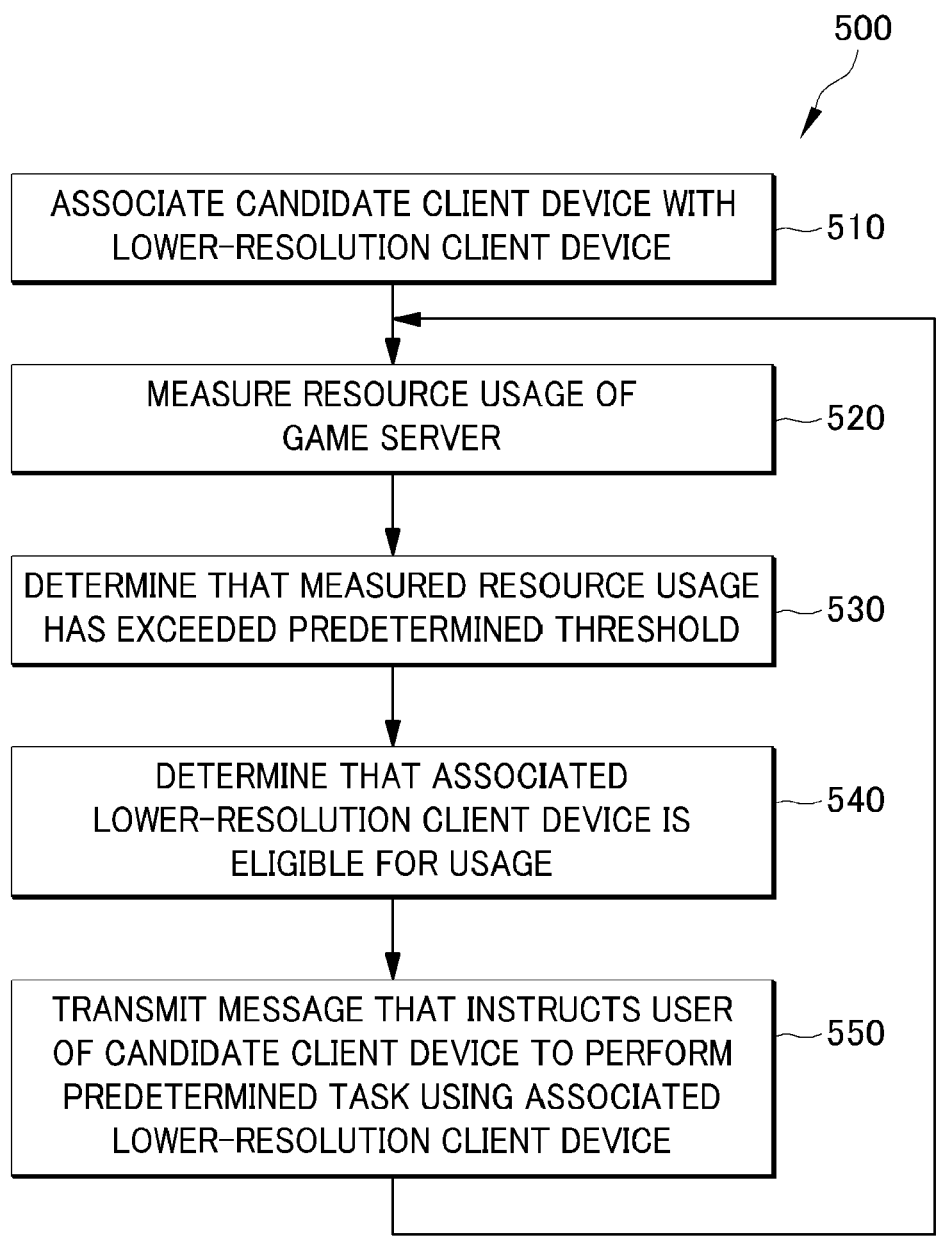
FIG. 5 shows an example flow diagram of a process for implementing a load balancing scheme, arranged in accordance with at least some embodiments described herein.

FIG. 5 shows an example flow diagram of a process 500 for implementing a load balancing scheme, arranged in accordance with at least some embodiments described herein.

Process 500 may be implemented in a load balancing system such as load balancing system 200 including, for example, resource usage measurement unit 210, candidate identification unit 220, eligibility determination unit 230, transmission unit 240, and storage unit 250. Thus, reference may be made to the embodiments depicted and described with reference to FIGS. 1-4. Process 500 may include one or more operations, actions, or functions as illustrated by one or more blocks 510, 520, 530, 540 and/or 550. Although illustrated as discrete blocks, various blocks may be divided into additional blocks, combined into fewer blocks, or eliminated, depending on the desired implementation. Processing may begin at block 510.

At block 510 (Associate Candidate Client Device with Lower-Resolution Client Device), load balancing system 200 may associate a candidate client device (e.g., first client device 120) with a lower-resolution client device (e.g., second client device 130). In some embodiments, the candidate client device and the associated lower-resolution client device may be registered to a same user (e.g., user 100) with game server 110 or a corresponding gaming service provider. Processing may continue from block 510 to block 520.

At block 520 (Measure Resource Usage of Game Server), load balancing system 200 may measure resource usage of game server 110. By way of example, but not limitation, the resource usage of game server 110 may be associated with at least one of usage of a central processing unit (CPU) of game server 110, usage of a graphic processing unit (GPU) of game server 110, usage of a main memory of game server 110, usage of a graphic memory of game server 110, I/O (input/output) usage of game server 110 (such as bandwidth usage of a network to which game server 110 is connected, storage usage of game server 110, etc.), or power consumption of game server 110, etc. Processing may continue from block 520 to block 530.

At block 530 (Determine that Measured Resource Usage Has Exceeded Predetermined Threshold), load balancing system 200 may determine that the measured resource usage has exceeded a predetermined threshold. By way of example, but not limitation, the predetermined threshold may be associated with processing power of game server 110, which may be associated with at least one of processing power of the CPU of game server 110, processing power of the GPU of game server 110, capacity of the main memory of game server 110, capacity of the graphic memory of game server 110, I/O capacity of game server 110, or power capacity of game server 110, etc. Processing may continue from block 530 to block 540.

At block 540 (Determine that Associated Lower-Resolution Client Device Is Eligible for Usage), load balancing system 200 may determine that the associated lower-resolution client device is eligible and/or available for usage. By way of example, but not limitation, load balancing system 200 may transmit, to the candidate client device, a query regarding usage availability of the associated lower-resolution client device, and determine the usage availability of the associated lower-resolution client device based on, at least, a response to the query. By way of another example, but not limitation, load balancing system 200 may determine the usage availability of the associated lower-resolution client device based on, at least, whether the candidate client device and the associated lower-resolution client device are located proximate to each other, and/or communicatively connected to each other. Processing may continue from block 540 to block 550.

At block 550 (Transmit Message that Instructs User of Candidate Client Device to Perform Predetermined Task Using Associated Lower-Resolution Client Device), load balancing system 200 may transmit, to the candidate client device and/or the associated lower-resolution client device, a message that instructs the user of the candidate client device to perform a predetermined task using the associated lower-resolution client device. Then, processing may continue from block 550 to block 520 again.

As such, the user may play the same game with the associated lower-resolution client device, while the overall resource usage of game server 110 may be reduced.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
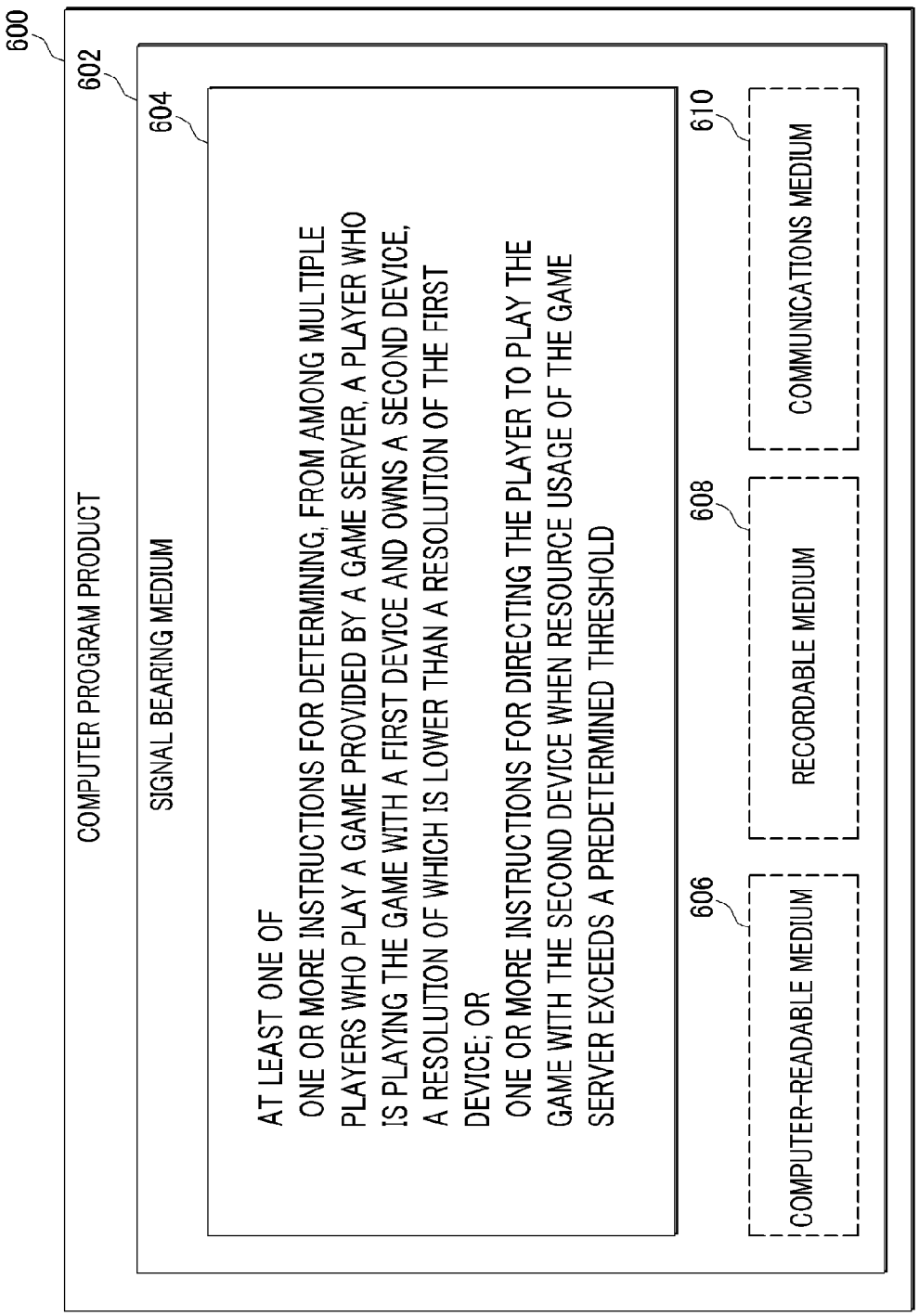
FIG. 6 illustrates an example computer program product that may be utilized to implement a load balancing scheme, arranged in accordance with at least some embodiments described herein.

FIG. 6 illustrates an example computer program product 600 that may be utilized to implement a load balancing scheme, arranged in accordance with at least some embodiments described herein.

As depicted, computer program product 600 may include a signal bearing medium 602. Signal bearing medium 602 may include one or more instructions 604 that, when executed by, for example, a processor of load balancing system 200, may provide the functionality described above with respect to FIGS. 1-5. By way of example, instructions 604 may include: one or more instructions for determining, from among multiple players who play a game provided by a game server, a player who is playing the game with a first device and owns a second device, a resolution of which is lower than a resolution of the first device; or one or more instructions for directing the player to play the game with the second device when resource usage of the game server exceeds a predetermined threshold.

In some implementations, signal bearing medium 602 may encompass a computer-readable medium 606, such as, but not limited to, a hard disk drive, a CD, a DVD, a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to one or more modules of load balancing system 200 by an RF signal bearing medium 602, where the signal bearing medium 602 is conveyed by a wireless communications medium 610 (e.g., a wireless communications medium conforming with the IEEE 802.11 standard).

Figure 7:
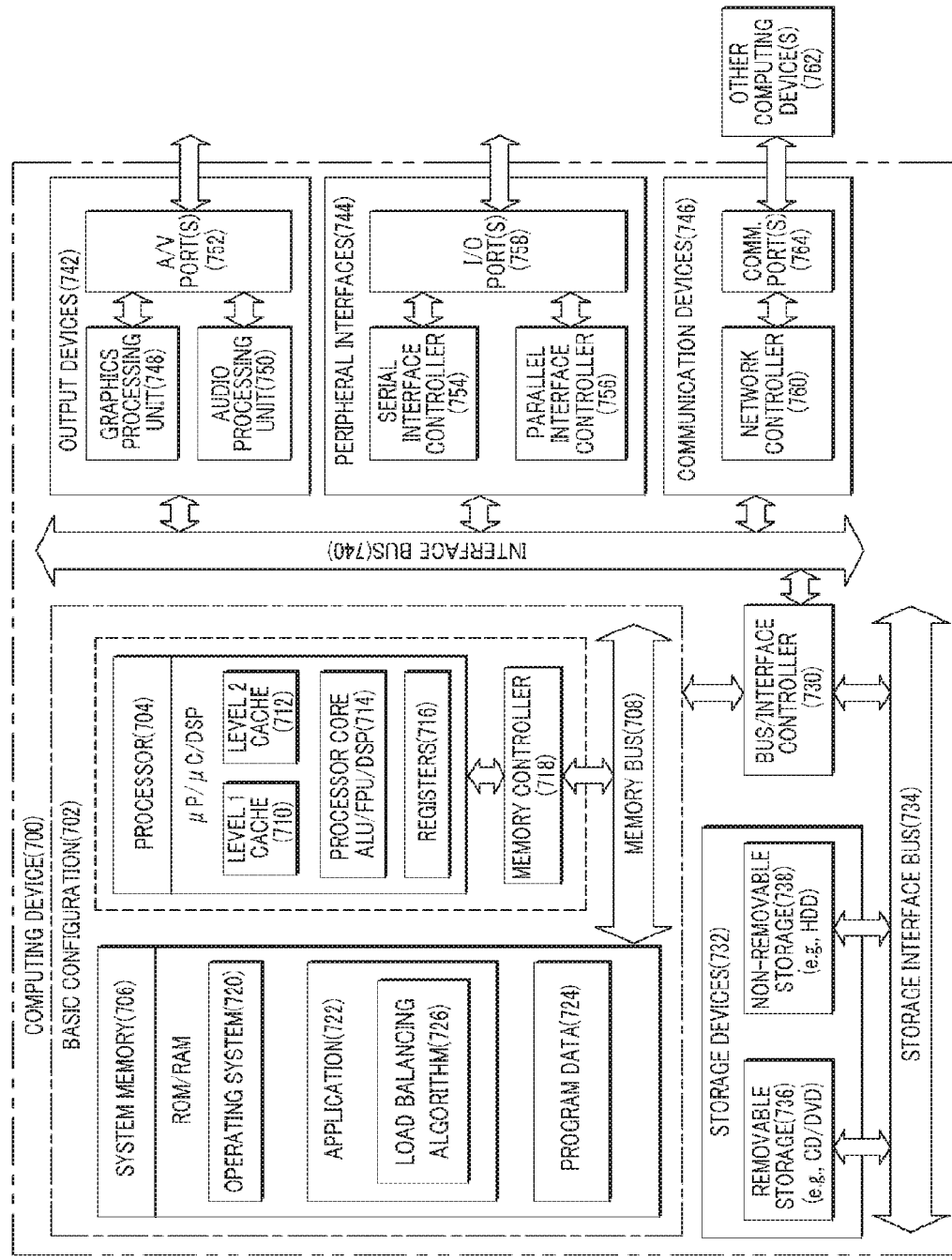
FIG. 7 is a block diagram illustrating an example computing device that may be utilized to implement a load balancing scheme, arranged in accordance with at least some embodiments described herein.

FIG. 7 is a block diagram illustrating an example computing device 700 that may be utilized to implement a load balancing scheme, arranged in accordance with at least some embodiments described herein.

In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724.

Application 722 may include a load balancing algorithm 726 that may be arranged to perform the functions as described herein including the actions described with respect to the load balancing system 200 architecture as shown in FIGS. 2-4 or including the actions described with respect to the flow chart shown in FIG. 5. Program data 724 may include any data that may be useful for providing the load balancing scheme as is described herein. In some examples, application 722 may be arranged to operate with program data 724 on an operating system 720 such that the load balancing scheme as described herein may be provided.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a load balancing system that comprises at least one processor, a memory controller and a memory storing instructions which, when executed by the at least one processor, cause the at least one processor to perform the method, the method comprising:
    identifying, from among a plurality of client devices that are communicatively coupled to a game server, a candidate client device that is associated with a lower-resolution client device;
    measuring resource usage of the game server;
    determining that the measured resource usage has exceeded a predetermined threshold; and
    transmitting, to the candidate client device and/or the associated lower-resolution client device, a message that instructs a user of the candidate client device to perform a predetermined task using the associated lower-resolution client device.

2. The method of claim 1, wherein the candidate client device and the associated lower-resolution client device are registered to a same user.

3. The method of claim 1, further comprising:
    determining that the associated lower-resolution client device is eligible for usage.

4. The method of claim 3, further comprising:
    transmitting, to the candidate client device, a query regarding usage availability of the associated lower-resolution client device.

5. The method of claim 3, wherein the determining that the associated lower-resolution client device is eligible for usage comprises determining that the candidate client device and the associated lower-resolution client device are located proximate to each other.

6. The method of claim 3, wherein the determining that the associated lower-resolution client device is eligible for usage comprises determining that the candidate client device and the associated lower-resolution client device are communicatively coupled to each other.

7. The method of claim 1, wherein the resource usage of the game server is associated with at least one of usage of a central processing unit (CPU) of the game server, usage of a graphic processing unit (GPU) of the game server, usage of a main memory of the game server, usage of a graphic memory of the game server, input/output (I/O) usage of the game server, or power consumption of the game server.

8. The method of claim 1, wherein the predetermined threshold is associated with processing power of the game server.

9. The method of claim 8, wherein the processing power of the game server is associated with at least one of processing power of a central processing unit (CPU) of the game server, processing power of a graphic processing unit (GPU) of the game server, capacity of a main memory of the game server, capacity of a graphic memory of the game server, input/output (I/O) capacity of the game server, or power capacity of the game server.

10. The method of claim 1, wherein the load balancing system is hosted by the game server.

11. A load balancing system comprising at least one processor and a memory storing instructions which, when executed by the at least one processor, cause the at least one processor to:
measure resource usage of a game server;
identify, from among a plurality of client devices that are communicatively coupled to the game server, a candidate client device that is associated with a lower-resolution client device; and
transmit, to the identified candidate client device and/or the associated lower-resolution client device, a message that instructs a user of the candidate client device to perform a predetermined task using the associated lower-resolution client device, when the measured resource usage exceeds a predetermined threshold.

12. The load balancing system of claim 11, wherein the memory stores further instructions that cause the at least one processor to:
store information regarding a relationship among the candidate client device, the associated lower-resolution client device, and the user.

13. The load balancing system of claim 11, wherein the memory stores further instructions that cause the at least one processor to:
determine whether the associated lower-resolution client device is eligible for usage, and
transmit the message to the candidate client device and/or the associated lower-resolution client device, when determined that the associated lower-resolution client device is eligible for usage.

14. The load balancing system of claim 13, wherein the memory stores further instructions that cause the at least one processor to determine whether the associated lower resolution client device is eligible for usage based on, at least, a user input.

15. The load balancing system of claim 13, wherein the memory stores further instructions that cause the at least one processor to determine whether the associated lower resolution client device is eligible for usage based on, at least, whether the candidate client device and the associated lower-resolution client device are located proximate to each other.

16. The load balancing system of claim 13, wherein the memory stores further instructions that cause the at least one processor to determine whether the associated lower resolution client device is eligible for usage based on, at least, whether the candidate client device and the associated lower-resolution client device are communicatively coupled to each other.

17. The load balancing system of claim 11, wherein the resource usage of the game server is associated with at least one of usage of a central processing unit (CPU) of the game server, usage of a graphic processing unit (GPU) of the game server, usage of a main memory of the game server, usage of a graphic memory of the game server, input/output (I/O) usage of the game server, or power consumption of the game server.

18. The load balancing system of claim 11, wherein the predetermined threshold is associated with processing power of the game server.

19. The load balancing system of claim 18, wherein the processing power of the game server is associated with at least one of processing power of a central processing unit (CPU) of the game server, processing power of a graphic processing unit (GPU) of the game server, capacity of a main memory of the game server, capacity of a graphic memory of the game server, input/output (I/O) capacity of the game server, or power capacity of the game server.

20. A non-transitory computer-readable storage medium having stored thereon computer-executable instructions that, in response to execution, cause a processor operatively coupled to the computer-readable storage medium to perform operations, comprising:
identifying, from among a plurality of players who play a game provided by a game server, a player who is playing the game with a first device and owns a second device, a resolution of which is lower than a resolution of the first device; and
sending a message to the first device that directs the player to play the game with the second device when resource usage of the game server exceeds a predetermined threshold.

21. The computer-readable storage medium of claim 20, wherein the operations further comprise:
measuring the resource usage of the game server; and
comparing the measured resource usage with the predetermined threshold.

22. The computer-readable storage medium of claim 20, wherein the operations further comprise:
determining whether the second device is eligible for the player.

* * * * *